(12) United States Patent
Minato et al.

(10) Patent No.: US 12,030,177 B2
(45) Date of Patent: Jul. 9, 2024

(54) SUSPENDED INDUSTRIAL ROBOT

(71) Applicant: Kobe Steel, Ltd., Kobe (JP)

(72) Inventors: Tatsuji Minato, Fujisawa (JP);
Tomokatsu Isoyama, Fujisawa (JP);
Taichi Igarashi, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 41 days.

(21) Appl. No.: 17/625,633

(22) PCT Filed: Jun. 12, 2020

(86) PCT No.: PCT/JP2020/023269
§ 371 (c)(1),
(2) Date: Jan. 7, 2022

(87) PCT Pub. No.: WO2021/005968
PCT Pub. Date: Jan. 14, 2021

(65) Prior Publication Data
US 2022/0250263 A1   Aug. 11, 2022

(30) Foreign Application Priority Data

Jul. 8, 2019   (JP) .................................. 2019-127134

(51) Int. Cl.
*B25J 19/00* (2006.01)
*B25J 9/00* (2006.01)
*B23K 9/12* (2006.01)

(52) U.S. Cl.
CPC ......... *B25J 19/0025* (2013.01); *B25J 9/0018* (2013.01); *B23K 9/12* (2013.01)

(58) Field of Classification Search
CPC ........ B25J 9/0018; B25J 19/0025; B23K 9/12
See application file for complete search history.

(56) References Cited

U.S. PATENT DOCUMENTS

| 2006/0049159 A1 | 3/2006 | Nihei et al. | |
| 2009/0249915 A1* | 10/2009 | Iwai | ..................... B25J 19/0025 901/28 |
| 2015/0321344 A1* | 11/2015 | Hahakura | ................ B25J 19/04 74/490.02 |

(Continued)

FOREIGN PATENT DOCUMENTS

| CN | 1745953 A | 3/2006 |
| JP | 8-155881 A | 6/1996 |

(Continued)

OTHER PUBLICATIONS

International Search Report mailed on Sep. 1, 2020 in PCT/JP2020/023269 filed on Jun. 12, 2020, 3 pages.

*Primary Examiner* — William C Joyce
(74) *Attorney, Agent, or Firm* — Oblon, McClelland, Maier & Neustadt, L.L.P.

(57) ABSTRACT

In a suspended industrial robot, a base and a swivel section have an internal space into which a cable can be inserted. The base has an insertion opening through which at least the cable can be passed into the internal space from the outside. A first cable holding part that holds the cable is installed on at least one of a first arm and a second arm. The cable passes through the internal space of the base and the swivel section and is routed up to an end effector with a midway portion of the cable being held by the first cable holding part.

16 Claims, 11 Drawing Sheets

(56) References Cited

U.S. PATENT DOCUMENTS

| | | | |
|---|---|---|---|
| 2017/0282381 A1* | 10/2017 | Inoue | B25J 19/0025 |
| 2017/0282382 A1* | 10/2017 | Inoue | B25J 19/0029 |
| 2019/0022851 A1* | 1/2019 | Konno | B25J 19/0025 |
| 2019/0054614 A1* | 2/2019 | Ohtsubo | F16H 57/027 |
| 2019/0381596 A1 | 12/2019 | Sakurai et al. | |
| 2020/0298427 A1* | 9/2020 | Inoue | B25J 19/0029 |

FOREIGN PATENT DOCUMENTS

| | | | |
|---|---|---|---|
| JP | 2006-68806 A | | 3/2006 |
| JP | 2018-122404 A | | 8/2018 |
| WO | WO 2018/143055 | * | 8/2018 |

* cited by examiner

SUSPENDED INDUSTRIAL ROBOT

TECHNICAL FIELD

The present invention relates to a suspended industrial robot.

BACKGROUND ART

Suspended industrial robots often perform operations in narrow spaces between workpieces, jigs, and other peripheral devices. The area of interference of an arm or an end effector at the distal end of such a robot with any of peripheral elements is small, which does not substantially cause problems. However, interference of a cable with a workpiece, a jig, or any of other peripheral devices tends to cause problems.

An arm welding robot disclosed by PTL 1 includes a robot base provided on a ceiling, an upper arm extending downward, a front arm including a front-arm proximal portion and a first wrist element, a second wrist element, and a welding torch. The first wrist element is provided at the distal end of the front-arm proximal portion and is rotatable about a first axis. The second wrist element is provided on the first wrist element and is rotatable about a second axis. In a robot position in which the second axis is above the front-arm proximal portion and the distal end of the second wrist element is below the second axis, the distal end of the welding torch is oriented downward. The front-arm proximal portion is provided with a slide mechanism. The slide mechanism includes a slider slidable along the first axis and to which a torch cable is attached, and means for applying a force of pulling the slider in a direction parallel to the first axis and away from the welding torch. Thus, the behavior of the torch cable is stabilized, minimizing the interference.

CITATION LIST

Patent Literature

PTL 1: Japanese Unexamined Patent Application Publication No. 2006-68806

SUMMARY OF INVENTION

Technical Problem

According to PTL 1, the torch cable is routed up to the welding torch via a welding wire holding guide, which is provided near the ceiling, and through a space above the first wrist element. Such a configuration may lead to a problem that when the robot swivels, the torch cable may be swung to interfere with or be wound around the robot itself, the workpiece, or any of other peripheral devices. To reduce the risk of the interference and winding of the torch cable, the operable range of the robot is limited. Such a situation may lead to another problem of a reduction in the usability of the robot, for example.

The present invention has been conceived in view of the above problems, and it is an object of the present invention to provide an industrial robot configured to prevent interference of a cable with a workpiece, a jig, or any of other peripheral devices that may occur when the robot advances into a narrow area, and in which it is less probable that the cable may swing and be wound around any of such elements while the robot, is in operation, whereby the operable range of the robot, is widened, increasing the usability of the robot.

Solution to Problem

The above object of the present invention is achieved by configuration (1) of a suspended industrial robot described below.

(1) A suspended industrial robot comprising:
a base provided on a traveling structure of an overhead travelling crane or on a ceiling;
a swivel section capable of swiveling on the base about a vertical shaft;
a first arm coupled to the swivel section with a driving shaft in between;
a second arm coupled to the first arm with an other driving shaft in between;
an end effector provided at a distal portion of the second arm; and
a cable one end of which is connected to the end effector,
wherein the base and the swivel section have an internal space into which the cable is allowed to be inserted,
wherein the base has an insertion opening through which at least the cable is allowed to be passed into the internal space from an outside,
wherein a first cable holding part that holds the cable is installed on at least one of the first arm and the second arm, and
wherein the cable passes through the internal space of the base and the swivel section and is routed up to the end effector with a midway portion of the cable being held by the first cable holding part.

Advantageous Effects of Invention

In the suspended industrial robot according to the present invention, the base and the swivel section have the internal space into which the cable is allowed to be inserted; the base has the insertion opening through which at least the cable is allowed to be passed into the internal space from the outside; and the first cable holding part that holds the cable is installed on at least one of the first arm and the second arm. The cable passes through the internal space of the base and the swivel section and is routed up to the end effector with the midway portion of the cable being held by the first cable holding part. Such a configuration prevents interference of the cable with a workpiece, a jig, or any of other peripheral devices that may occur when the robot advances into a narrow area. Furthermore, it is less probable that the cable may swing and be wound around any of such elements while the robot is in operation, whereby the operable range of the robot, is widened, increasing the usability of the robot.

DESCRIPTION OF EMBODIMENTS

An embodiment of the suspended industrial robot according to the present invention will now be described in detail with reference to the drawings. The following is an exemplary embodiment in which the suspended industrial robot is applied to a suspended welding robot.

Figure 1:
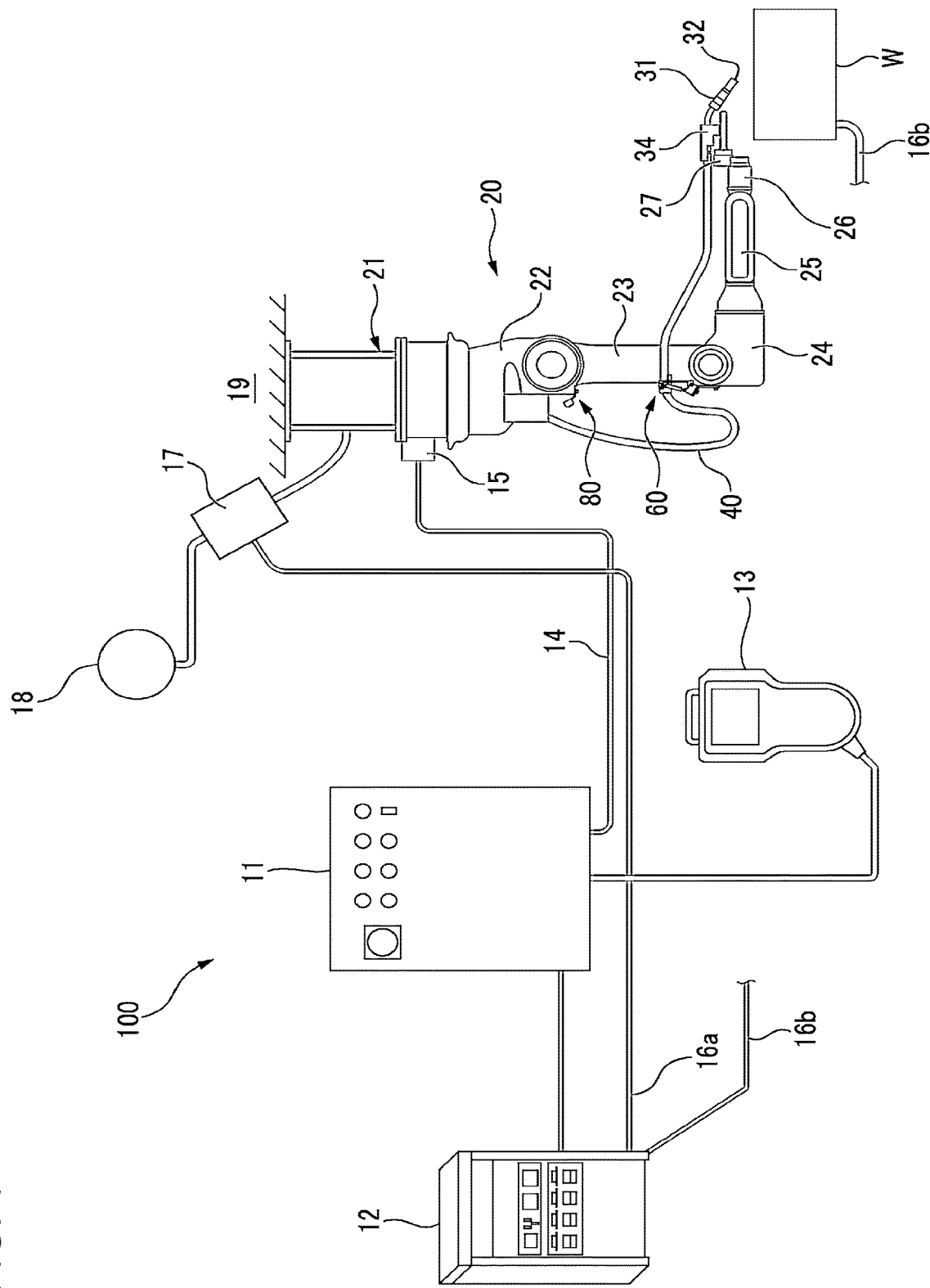
FIG. 1 is a diagram illustrating the overall configuration of a welding system that includes a suspended industrial robot according to the present invention.

FIG. 1 is a diagram illustrating the overall configuration of a welding system that includes a suspended welding robot according to the present invention.

A welding system 100 includes a suspended welding robot (hereinafter also simply referred to as welding robot) 20, a control apparatus 11, a welding power source 12, a teaching controller 13, and a welding torch 31 that is connected to a shaft at the distal end of the welding robot 20.

The welding robot 20 performs welding as follows: the control apparatus 11 activates the welding robot 20 to move the welding torch 31 to a welding position, and the welding power source 12 controls a welding current and an arc voltage to generate an arc between a welding wire 32 at the distal end of the welding torch 31 and a workpiece W.

The control apparatus 11 is connected to an external connecting part 15 of the welding robot 20 through a control cable 14 and operates the welding robot 20 in accordance with teaching data that is inputted from the teaching controller 13. The control apparatus 11 is a computer apparatus in which a CPU reads and executes programs that are stored in a storage such as a ROM, a RAM, or a hard disk, whereby relevant elements of the welding system 100 are controlled.

A welding wire 32 is an expendable electrode such as a flux wire or a solid wire and is fed from a wire pack 18 to the distal end of the welding torch 31 with the aid of a wire feeding device 17. The wire feeding device 17 is connected to the welding power source 12 through a communication line, which is not illustrated. The wire feeding device 17 controls the feeding of the welding wire 32 in accordance with a command signal received from the welding power source 12.

Power cables 16a and 16b are connected to the welding power source 12 and are also connected to the above wire feeding device 17 and the workpiece W, respectively. In response to a command issued by the control apparatus 11, a welding current is outputted from the welding power source 12. The welding current flows through the power cable 16a to the wire feeding device 17, further flows through a torch cable 40 and the welding torch 31 that are included in the welding robot 20, and is supplied to the welding wire 32. The welding torch 31 is supplied with a shielding gas so as to be protected from air that may be taken in during welding. The welding torch 31 is also supplied with cooling water for cooling the torch.

The control apparatus 11 causes the welding power source 12 to supply the welding current between the distal end of the welding wire 32 and the workpiece W so as to generate an arc at the distal end of the welding torch 31, which is surrounded by the shielding gas. Then, the control apparatus 11 causes the welding robot 20 to move the arcing welding torch 31 along a locus that has been taught in advance. Thus, welding on the workpiece W is achieved.

Referring to FIGS. 1 to 4, the suspended welding robot 20 is a typical six-axis robot that has six driving shafts.

The suspended welding robot 20 includes a base 21 provided on a ceiling 19, a swivel section 22 provided at the bottom of the base 21 in such a manner as to swivel about a first driving shaft S1, and a first arm 23 one end of which is coupled to the swivel section 22 with a horizontally extending second driving shaft S2 in between and that is rotatable about the second driving shaft S2. The welding robot 20 further includes a second arm 24 connected to the other end of the first arm 23 with a third driving shaft S3 in between, the third driving shaft S3 extending parallel to the second driving shaft S2; a wrist swiveling section 25 provided on the second arm 24 and being rotatable about the axis of the arm with the aid of a fourth driving shaft S4; a wrist bending section 26 connected to the wrist swiveling section 25 with a fifth driving shaft S5 in between; and a wrist rotating section 27 connected to the distal end of the wrist bending section 26 with a sixth driving shaft S6 in between. The combination of the first arm 23, the second arm 24, the wrist swiveling section 25, the wrist bending section 26, and the wrist rotating section 27 serves as a multi-articulated arm.

The first driving shaft S1 serves as the vertical shaft according to the present invention. The second driving shaft S2 serves as the driving shaft according to the present invention. The third driving shaft S3 serves as the other driving shaft according to the present invention.

The first driving shaft S1 of the suspended welding robot 20 is driven by a swivel-section-driving motor 28, such as a servo motor, provided on the swivel section 22. The second to sixth driving shafts S2 to S6 are driven by respective driving motors, such as servo motors, which are not illustrated. The driving motors each receive a driving signal from the control apparatus 11 through a motor-power-feed control cable 41, which will be described below, whereby the angles of rotation of the driving shafts are controlled. Thus, the welding torch 31 is positioned in a desired orientation in an XYZ space.

In the present configuration, a two-axis weaver 34 is provided between the sixth driving shaft S6 and the welding torch 31. The sixth driving shaft S6 is provided for the wrist rotating section 27 and at the most distal position of the multi-articulated arm. The two-axis weaver 34 swings the distal end of the welding torch 31 in the directions of two axes that are orthogonal to each other. The two-axis weaver 34 may be omitted.

As illustrated in FIGS. 2, 3, 5, and 6, the base 21 includes a prism-shaped suspended pedestal 51 that is fixed to the ceiling 19 with bolts, and a round-columnar robot foundation 52 that is fixed to the lower surface of the suspended pedestal 51 with bolts. The suspended pedestal 51 has an insertion opening 53 in a side face thereof so that the torch cable 40 is to be inserted thereinto. The robot foundation 52 includes a pipe-shaped cable insertion part 54 that is fixed at a position near the center of the first driving shaft S1, which is the center of rotation of the swivel section 22. The cable insertion part 54 extends vertically along the first driving shaft S1 up to the swivel section 22.

The swivel section 22 is fitted to the robot foundation 52 in a turnable manner. The swivel section 22 includes a substantially cylindrical swivel section body 55 in which a swivel mechanism is provided but is not illustrated, and a substantially U-shaped arm supporting part 56 that extends from two opposite positions on the circumference of the swivel section body 55.

The cable insertion part 54 extends up to the lower surface of the swivel section body 55 and thus provides an extraction opening 57, from which the torch cable 40 is extracted to the outside. That is, the extraction opening 57 is provided near the center of rotation of the swivel section 22. Accordingly, the torch cable 40 routed through the swivel section 22 passes through the position near the center of the first driving shaft S1.

Figure 7:
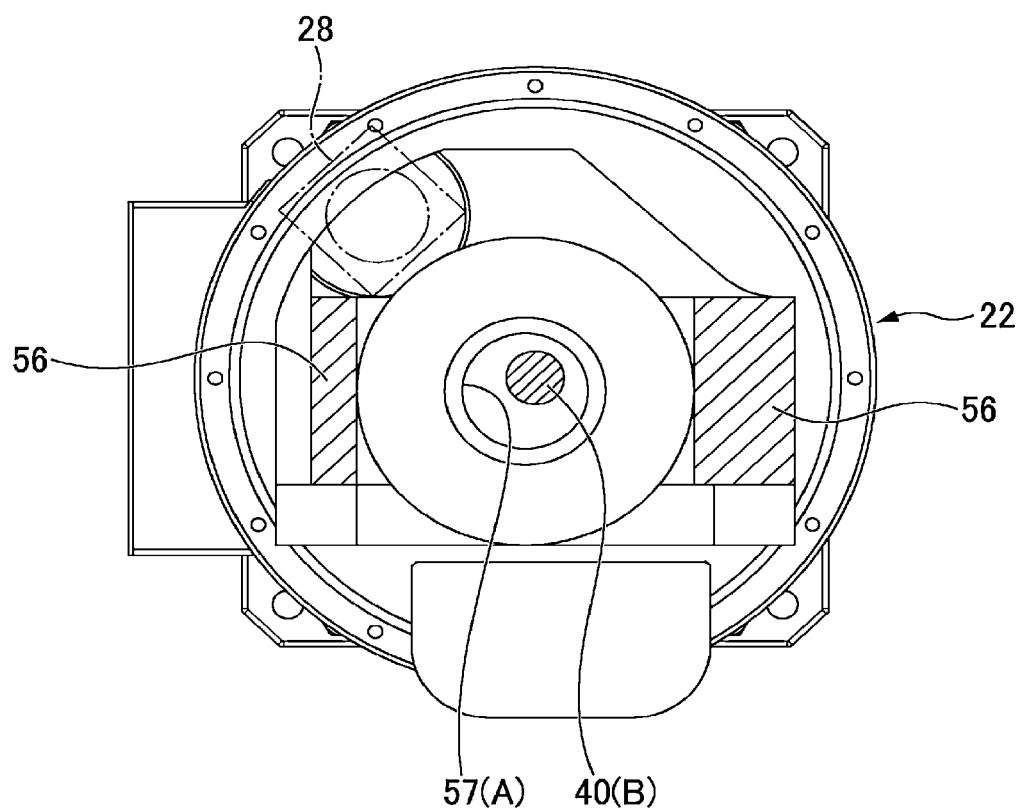
FIG. 7 is a cross-sectional view taken along line VII-VII illustrated in FIG. 5.

Referring to FIG. 7, the ratio of a cross-sectional area B of the torch cable 40 to an opening area A of the extraction opening 57 (B/A) is set to 40% or smaller. In the present embodiment, the cross-sectional area B of the torch cable 40 refers to an area that is enclosed by a leather sheath, which will be described separately below.

The second driving shaft S2 is provided at the lower end of the arm supporting part 56 and at a position deviating in the radial direction from the first driving shaft S1 of the swivel section 22. The first arm 23 is provided on the second driving shaft S2 in a swingable manner. The arm supporting part 56 has a holding hole 58 at a position near the extension of the center axis of the swivel section 22. The holding hole 58 serves as a second cable holding part through which the torch cable 40 is passed and thus supported. That is, the torch cable 40 that is passed through the extraction opening 57 runs through an internal space SB provided in the swivel section 22, and is extracted from the holding hole 58 of the arm supporting part 56 toward the lower side of the swivel section 22.

The second cable holding part that holds the torch cable 40 is not limited to the holding hole 58 employed in the present embodiment and may be another element such as a cutout, as long as the torch cable 40 is held at or near the swivel section 22.

Figure 3:
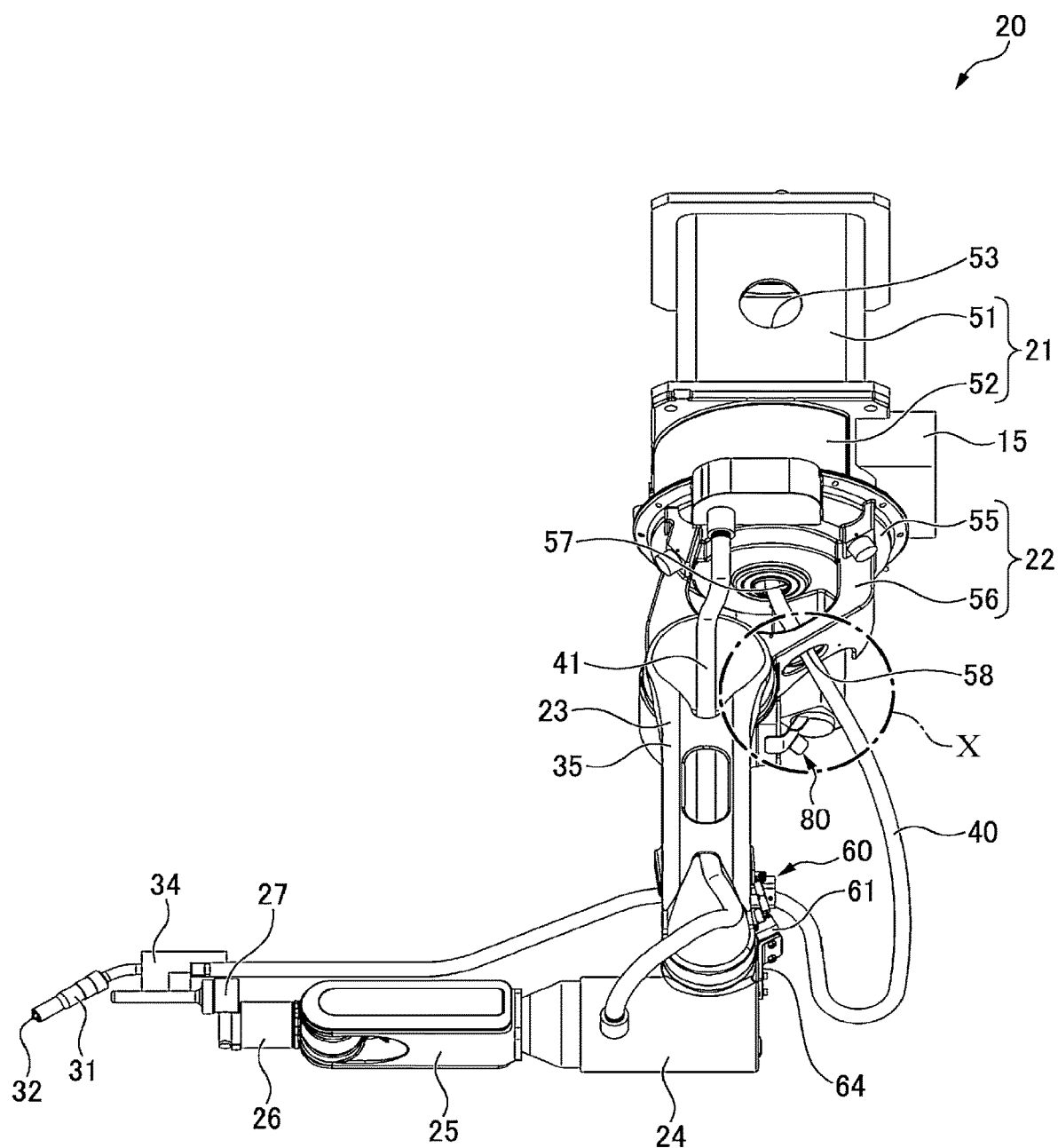
FIG. 3 is a lower right perspective view of the suspended welding robot illustrated in FIG. 1.
Figure 4:
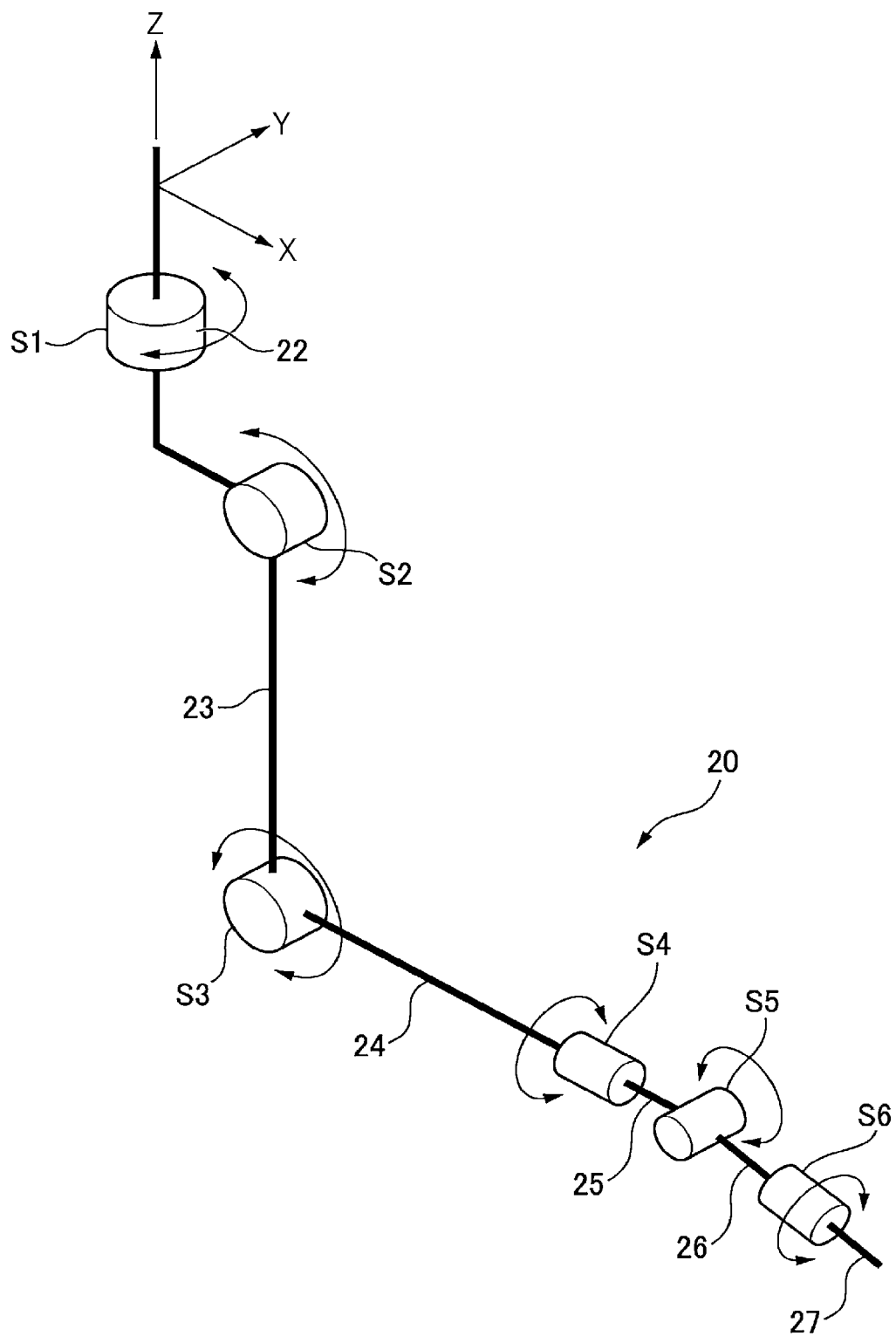
FIG. 4 is a diagram schematically illustrating driving shafts of the suspended welding robot illustrated in FIG. 2.
Figure 6:
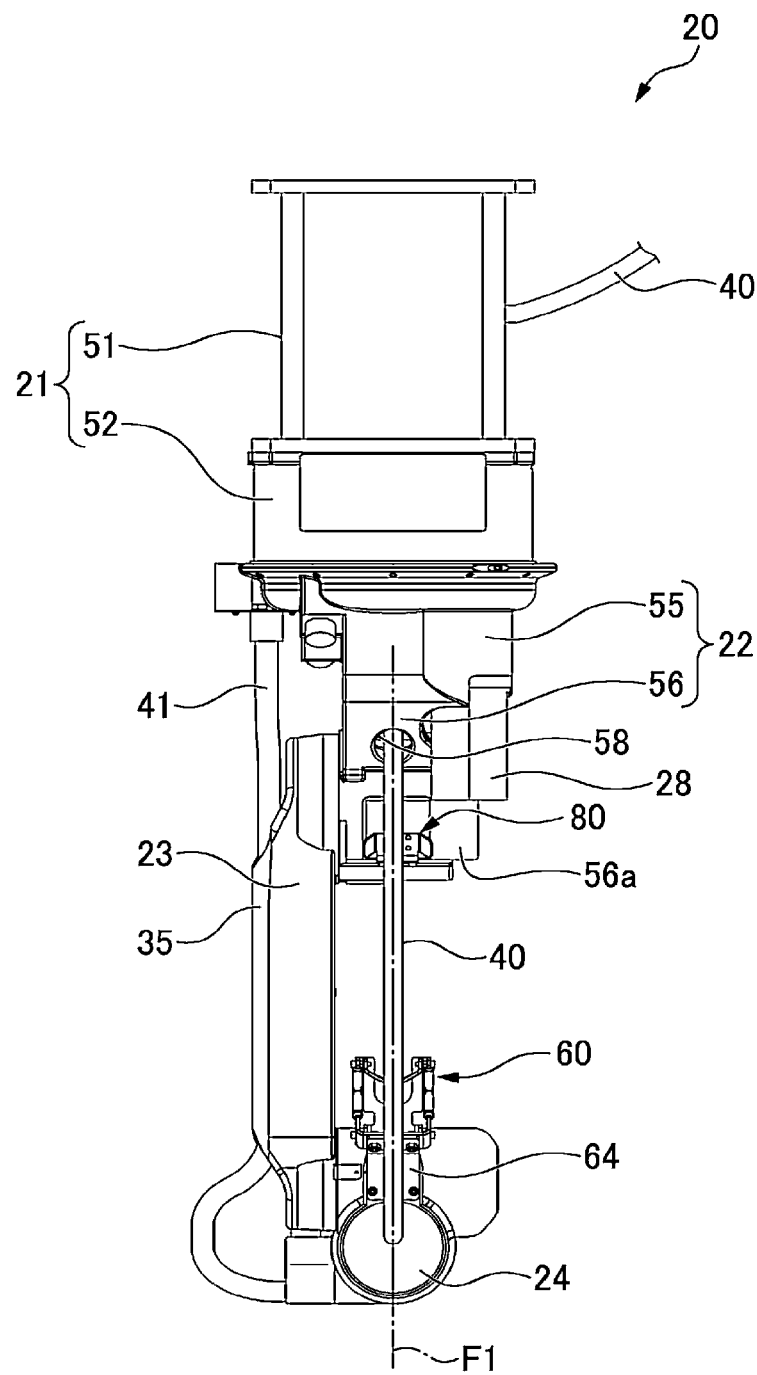
FIG. 6 is a rear view of the suspended welding robot.

As illustrated in FIGS. 3 and 6, the first arm 23 has a substantially cylindrical socket 35 on a side face thereof. The motor-power-feed control cable 41 is routed through the socket 35. The socket 35 extends in the longitudinal direction of the first arm 23. The motor-power-feed control cable 41 runs above the swivel section 22, is received by the substantially cylindrical socket 35 fixed to the side face of the first arm 23, and reaches the inside of the second arm 24. Such routing prevents interference between the motor-power-feed control cable 41 and the workpiece W that may occur when the first arm 23 advances into the workpiece. Furthermore, since the motor-power-feed control cable 41 and the torch cable 40 are routed separately, interference between the two cables is prevented.

Figure 2:
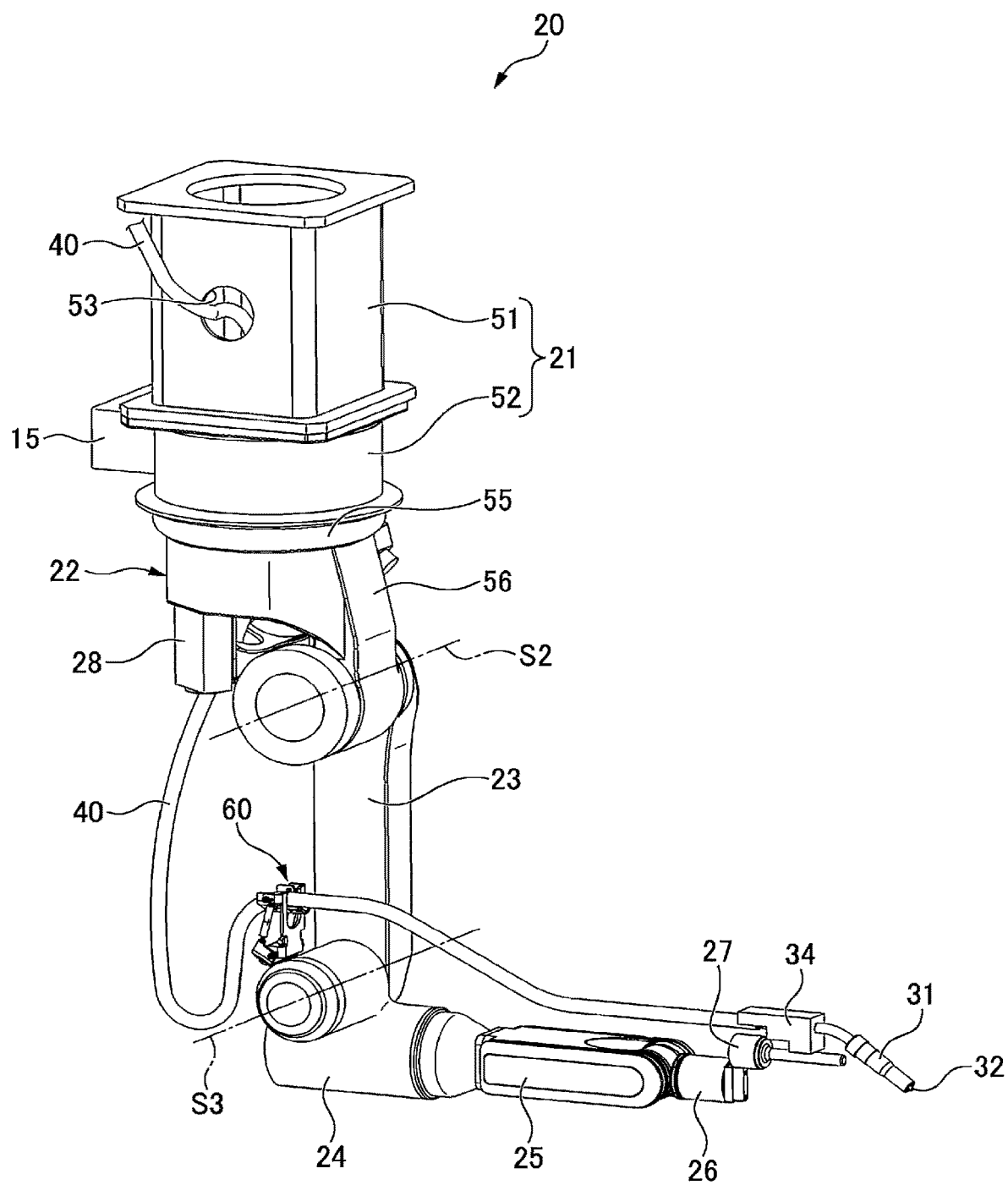
FIG. 2 is an upper left perspective view of the suspended welding robot illustrated in FIG. 1.

As illustrated in FIG. 2, the second arm 24 is provided with a first cable holding part 60 that holds the torch cable 40. In the present embodiment, the cable holding part 60 is attached to a portion of the second arm 24 that is around the third driving shaft S3.

Figure 5:
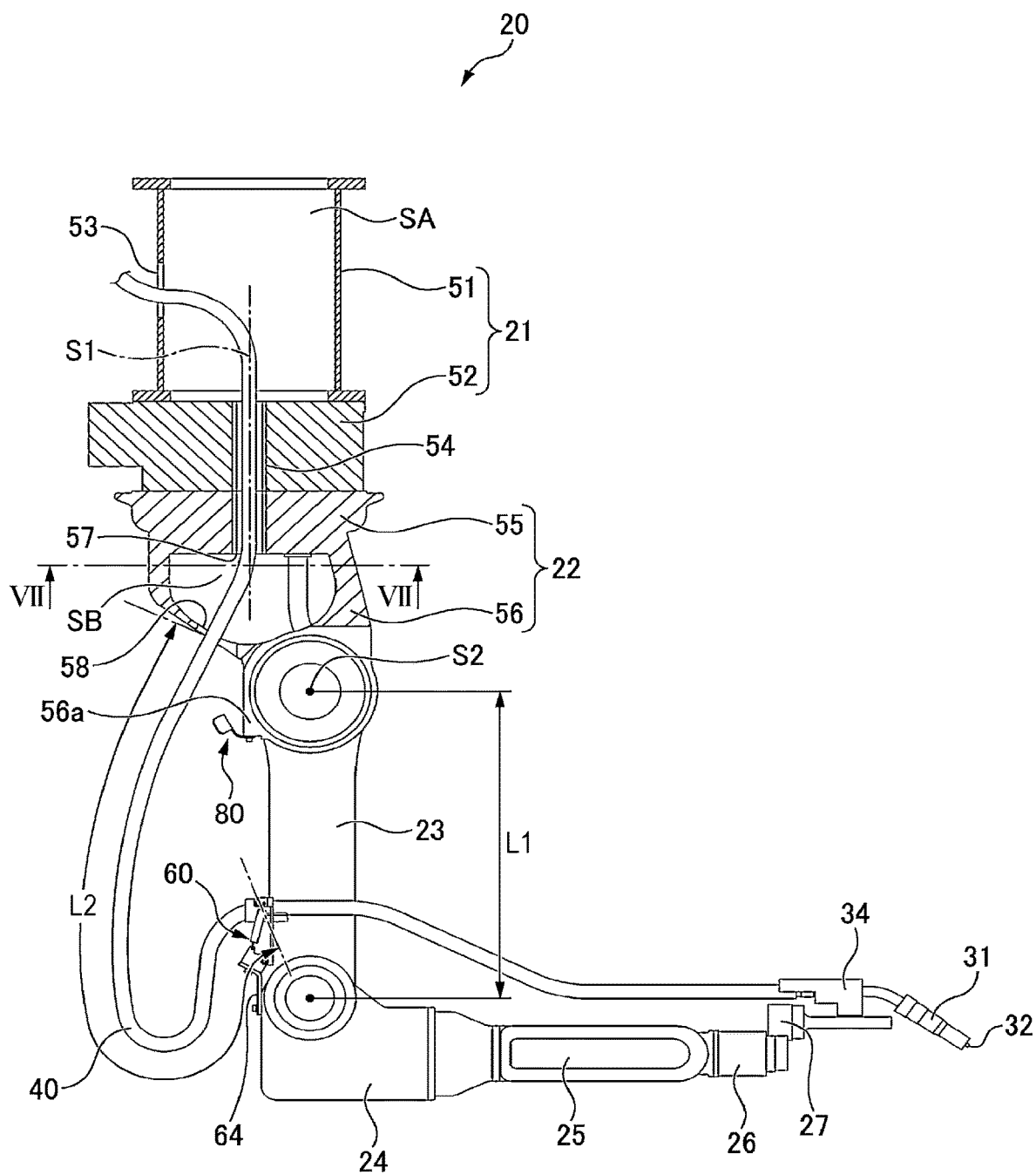
FIG. 5 is a partially cutaway side view of the suspended welding robot illustrated in FIG. 2.
Figure 8:
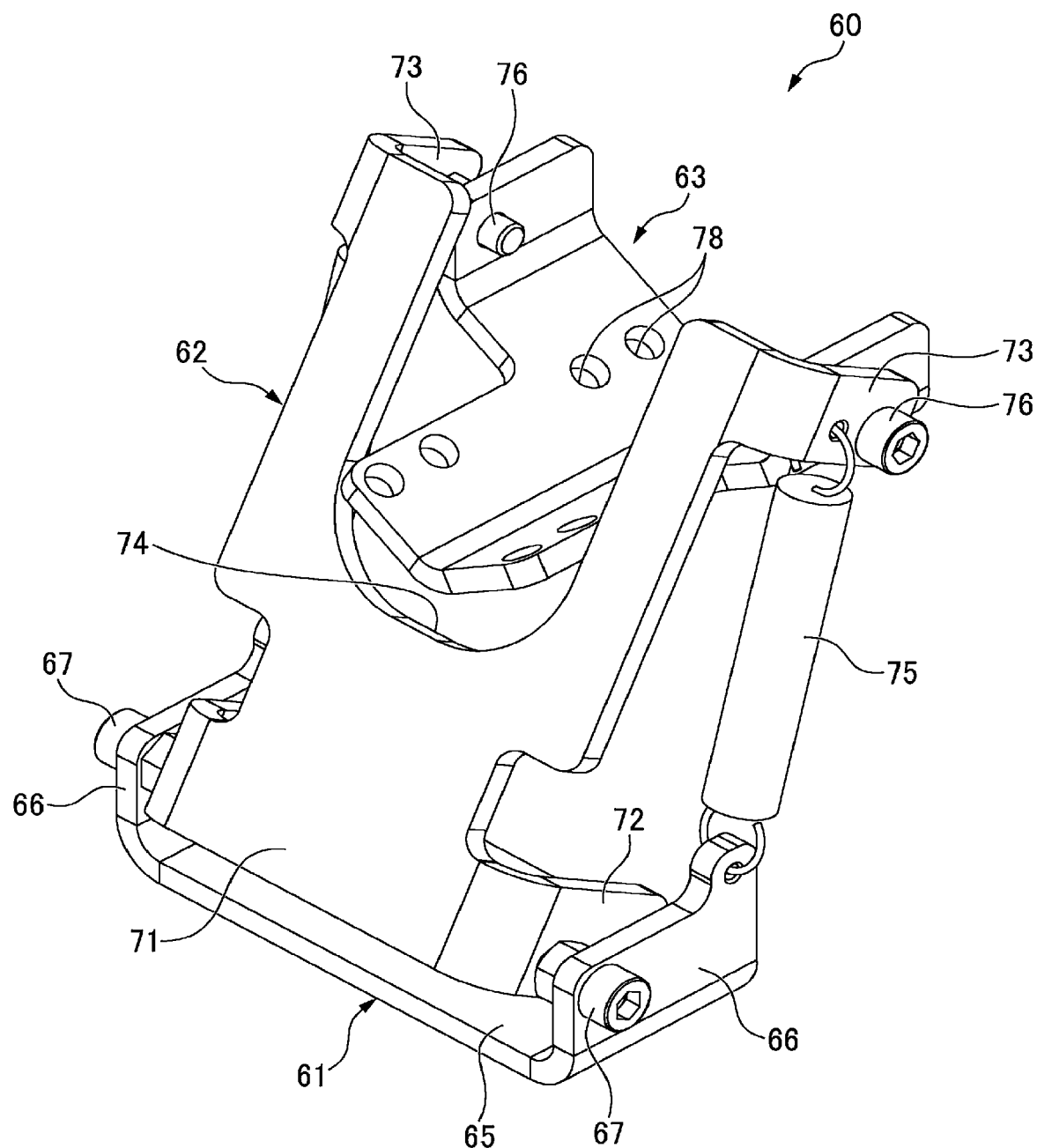
FIG. 8 is a perspective view of a first cable holding part.
Figure 9A:
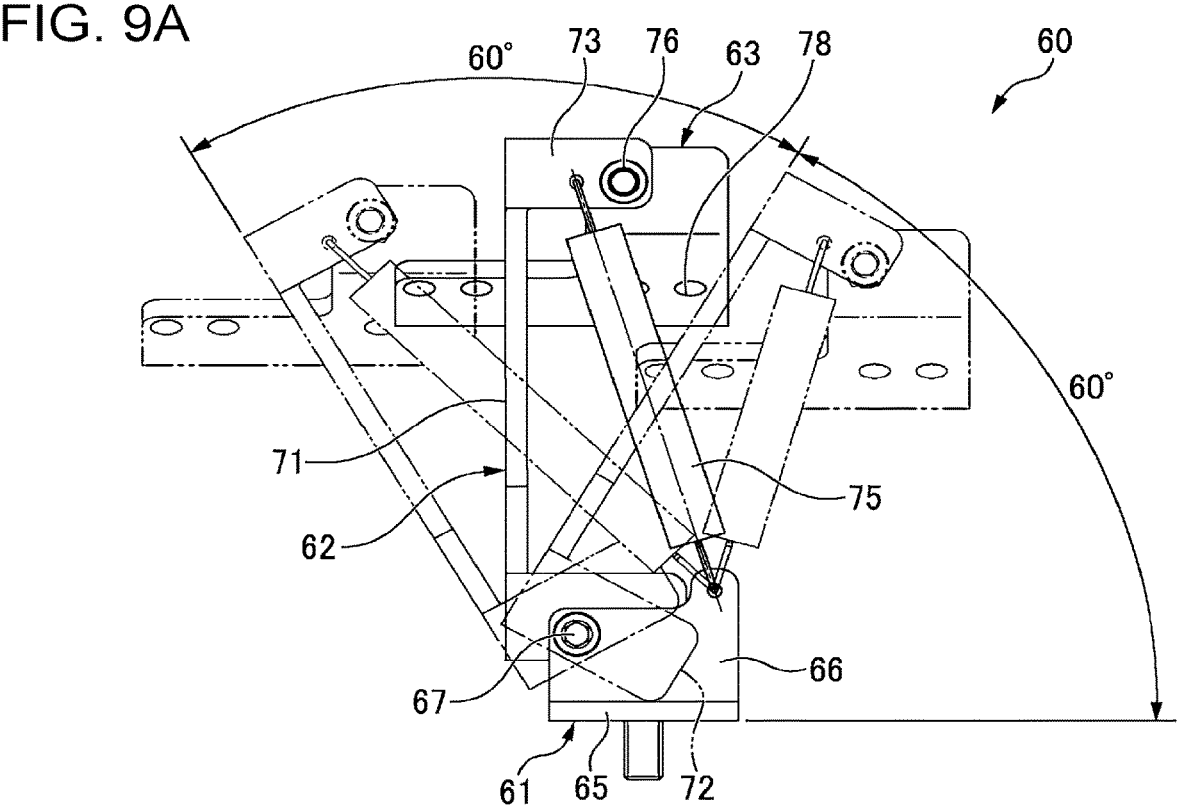
FIG. 9A is a side view of the first cable holding part.
Figure 9B:
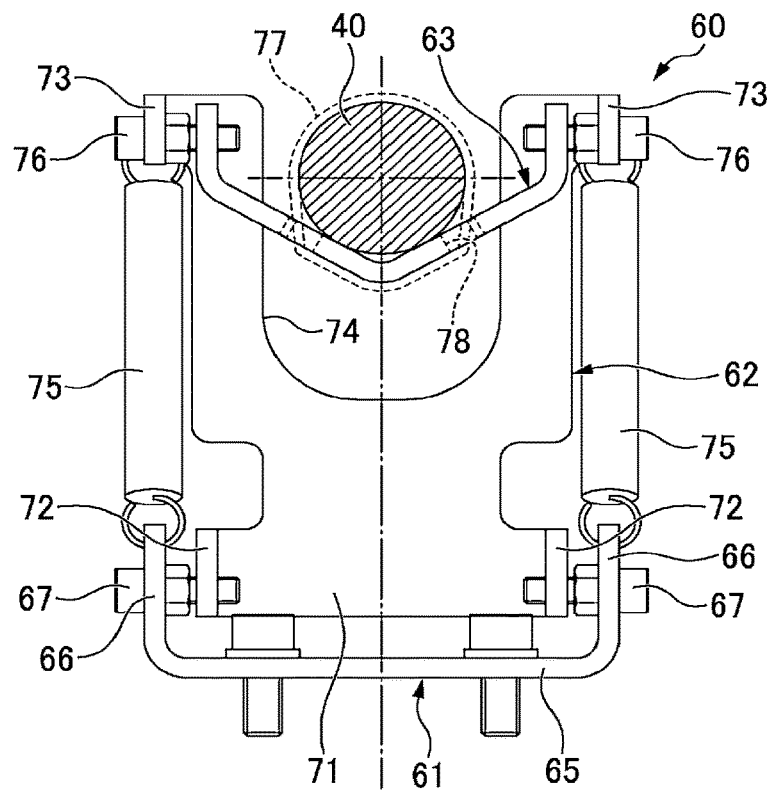
FIG. 9B is a rear view of the first cable holding part.

As illustrated in FIGS. 8, 9A, and 9B, the cable holding part 60 according to the present embodiment includes a movable mechanism, a rotatable holder 63, and tension springs 75. The movable mechanism includes a fixed member 61 made of sheet metal, and a movable member 62 attached to the fixed member 61 in a swingable manner. The rotatable holder 63 is attached to the movable member 62 in a rotatable manner and holds the torch cable 40. The tension springs 75 each serve as urging means provided between the movable member 62 and the fixed member 61. As illustrated in FIG. 5, the fixed member 61 of the cable holding part 60 is attached to the second arm 24 with the aid of a metal fitting 64 that is fixed to the second arm 24.

The fixed member 61 includes a base portion 65 that is fixed to the metal fitting 64 with bolts, and a pair of movable-part-supporting portions 66 that are formed by bending two opposite ends of the base portion 65 substantially perpendicularly. The pair of movable-part-supporting portions 66 are provided with a pair of supporting pins 67, respectively. The supporting pins 67 support one end portion of the movable member 62 such that the movable member 62 is swingable.

The movable member 62 includes a flat body 71, a pair of swing proximal portions 72 provided at the bottom of the body 71 and that are formed by bending relevant portions of the body 71 substantially perpendicularly, and a pair of rotatable-holder-supporting portions 73 provided at the top of the body 71 and that are formed by bending relevant portions of the body 71 substantially perpendicularly. The body 71 has a U-shaped cutout 74 in an upper portion thereof. The torch cable 40, which is to be fastened to the rotatable holder 63, is allowed to pass through the cutout 74.

In the initial position of the movable member 62 in which the body 71 thereof is at 60° with respect to the base portion 65 of the fixed member 61, the lower ends at the tips of the pair of swing proximal portions 72 are in contact with the base portion 65 so that the rotation of the movable member 62 in the direction away from the welding torch 31 (clockwise in FIG. 9A) is prevented. The tension springs 75 are each stretched between a corresponding one of the pair of movable-part-supporting portions 66 and a corresponding one of the pair of rotatable-holder-supporting portions 73, thereby urging the movable member 62 to be at the initial position. That is, in the state where the cable holding part 60 is fixed on the second arm 24, the tension springs 75 urge the movable member 62 to rotate in the direction away from the welding torch 31. The movable range of the movable member 62 is substantially 60°.

The rotatable holder 63 has a substantially V cross-sectional shape. Two opposite ends of the rotatable holder 63 are supported by a pair of supporting pins 76 fitted in the pair of rotatable-holder-supporting portions 73, so that the rotatable holder 63 is swingable. The rotatable holder 63 receives the torch cable 40 to be placed thereon. The rotatable holder 63 has fixing holes 78, through which binding bands 77 or the like are inserted to restrain the torch cable 40.

When the welding robot 20 is in a position illustrated in FIG. 5 in which the first arm 23 extends vertically and the second arm 24 extends horizontally, the cable holding part 60 holds the torch cable 40 with the movable member 62 thereof being in a neutral position as illustrated by solid lines in FIG. 9A.

As illustrated in FIG. 6, the holding hole 58 provided in the swivel section 22 and the cable holding part 60 attached to the second arm 24 are positioned in one virtual plane F1 that is perpendicular to the second driving shaft S2 and the third driving shaft S3. Therefore, the torch cable 40 extracted downward from the holding hole 58 and held with some slack by the cable holding part 60 is positioned in the virtual plane F1.

As in the present embodiment illustrated in FIG. 6, it is preferable that the center of the holding hole 58 be positioned in the virtual plane F1 that passes through a widthwise central portion of the cable holding part 60 and is perpendicular to the second driving shaft S2 and the third driving shaft S3, because such a configuration makes the torch cable 40 less likely to move around at the swiveling of the welding robot 20. Note that the above advantageous effect is produced as long as at least a portion of the holding hole 58 is positioned in the virtual plane F1. The above advantageous effect is also produced if the holding hole 58 and the cable holding part 60 are positioned such that the virtual plane F1 that is perpendicular to the second driving shaft S2 and the third driving shaft S3 passes through at least a portion of the holding hole 58 and at least a portion of the cable holding part 60.

Figure 10:
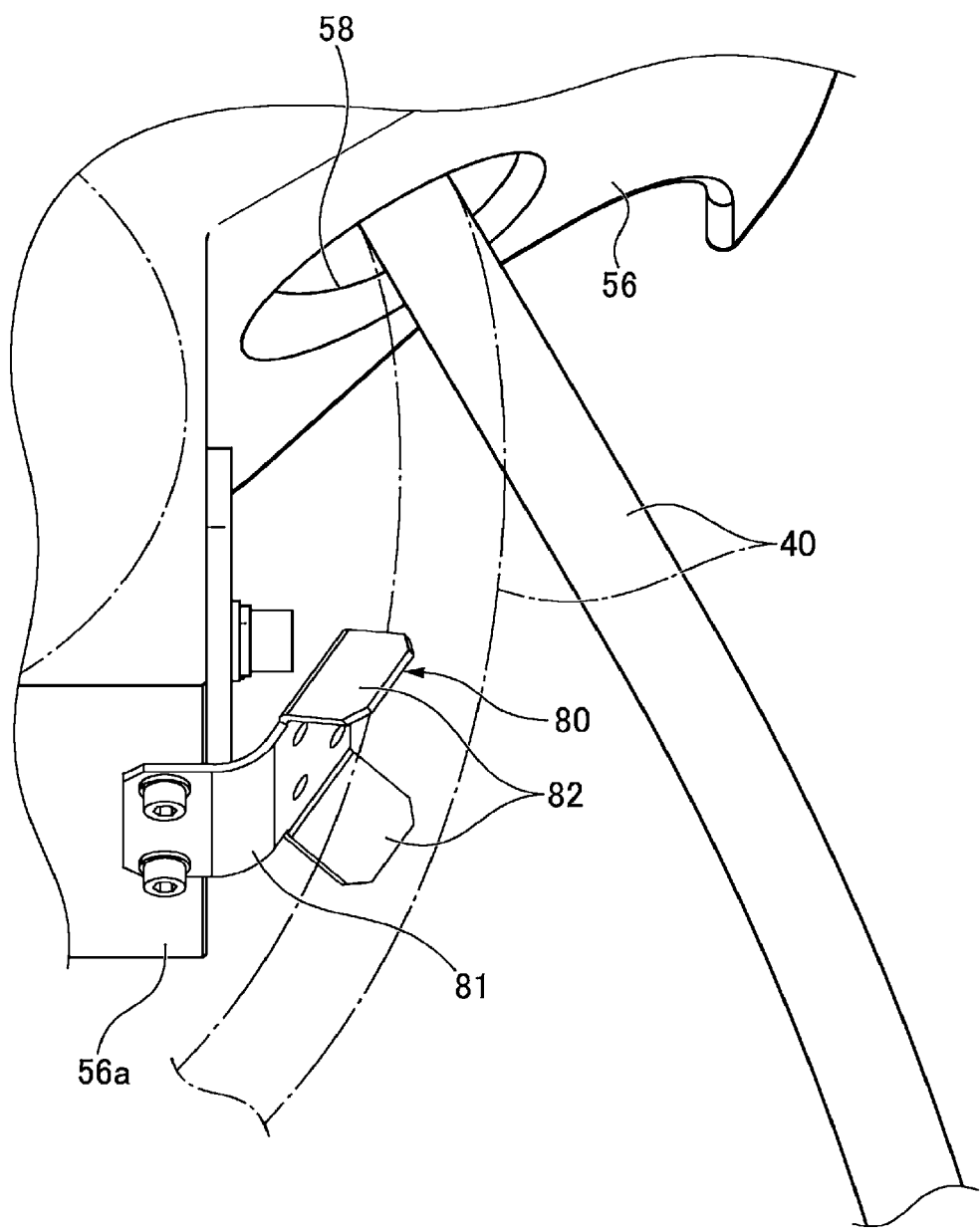
FIG. 10 is an enlargement of part X encircled in FIG. 3.

As illustrated in FIGS. 6 and 10, the arm supporting part 56 of the swivel section 22 is provided with a protector 80. The protector 80 is fixed to a portion of the arm supporting part 56 that is at a lower end corner 56*a* and that intersects the virtual plane F1. The protector 80 protects the torch cable 40 from any damage that may be caused by interference between the torch cable 40 and the lower end corner 56*a*. The protector 80 is made of sheet metal and has a curve forming a substantially U shape. The protector 80 includes an elastically deformable portion 81, one end of which is fixed to the lower end corner 56*a* of the arm supporting part 56. The elastically deformable portion 81 is deformable when the cable 40 comes into contact therewith. The protector 80 further includes a pair of cable guiding pieces 82. The cable guiding pieces 82 project from the left and right sides, respectively, of the other end of the elastically deformable portion 81 and extend in respective directions that are away from each other.

If the torch cable 40 comes close to the lower end corner 56*a* of the arm supporting part 56 while the welding robot 20 is in operation, the torch cable 40, which may be deflected leftward or rightward from the elastically deformable portion 81, is guided by the pair of cable guiding pieces 82 toward the elastically deformable portion 81. The material of the protector 80 is not limited to sheet metal and may be another material, as long as the protector 80 is capable of protecting the torch cable 40 by undergoing elastic deformation.

The torch cable 40 includes a conduit cable, a welding-wire power feeding cable, a voltage detecting line, and so forth, which are bundled altogether in a leather sheath or the like. The torch cable 40 may further include any of the following, according to need: a gas hose, a cooling water hose, an air tube for wire clamping, a control line, and so forth.

The conduit cable is a tube through which the welding wire 32 is to be passed. The wire is fed through the insertion hole of the conduit cable. Therefore, the welding wire 32 is prevented from being damaged, with increased ease of handling. The welding-wire power feeding cable is for feeding the welding current, outputted from the welding power source 12, to the welding torch 31. The gas hose is for feeding the shielding gas from a gas feeding device, not illustrated, to the welding torch 31. The cooling water hose is for feeding the cooling water from a cooling water circulating device, not illustrated, to the welding torch 31.

The torch cable 40 passes through the internal spaces SA and SB provided in the base 21 and the swivel section 22, respectively, runs around the first arm 23 and the second arm 24, and reaches the welding torch 31. Specifically, the torch cable 40 is passed through the insertion opening 53 provided in the suspended pedestal 51 into the internal spaces SA and SB provided in the base 21 and the swivel section 22, is extracted downward from the extraction opening 57 provided near the center of the swivel shaft of the swivel section 22, and is passed through the holding hole 58 provided in the swivel section 22 to the outside of the welding robot 20. Since the torch cable 40 passes through the cable insertion part 54 provided in a central region of the swivel section 22 in which the first driving shaft S1 extends, the occurrence of winding of the torch cable 40 around the swivel section 22 is prevented.

The cross-sectional area B of the torch cable 40 is set to 40% or smaller of the opening area A of the extraction opening 57. Therefore, even at the swiveling of the welding robot 20, it is less probable that the torch cable 40 may be rubbed at the extraction opening 57. Accordingly, the wear of the torch cable 40 is prevented. Furthermore, the torch cable 40 is less likely to be twisted. Therefore, good wire feeding performance is maintained. The lower limit for the ratio of the cross-sectional area B of the torch cable 40 to the opening area A is not particularly specified and may be at least greater than 0%, preferably 0.3% or greater, more preferably 1% or greater.

As described above, the torch cable 40 passes through the internal spaces SA and SB provided in the base 21 and the swivel section 22 and is held at the holding hole 58 provided in the swivel section 22. Therefore, even at the swiveling of the swivel section 22, the torch cable 40 is less likely to swing. Such a configuration reduces the probability of interference or winding of the torch cable 40 with or around the welding robot 20, the workpiece, or any of other peripheral devices. Consequently, the operable range of the welding robot 20 is widened, increasing the usability. The above configuration further reduces the probability of interference of the torch cable 40 with the workpiece that may occur when the torch cable 40 approaches a narrow area.

The torch cable 40 extracted from the holding hole 58 is given some slack that allows the welding torch 31 to move freely. The torch cable 40 is then restrained to the rotatable holder 63 of the cable holding part 60 and is routed up to the welding torch 31. More specifically, the torch cable 40 is routed up to the welding torch 31 with a midway portion thereof being supported at at least two points, which are the holding hole 58 and the cable holding part 60, positioned in one virtual plane F1 that is perpendicular to the second driving shaft S2 and the third driving shaft S3.

When the torch cable 40 whose midway portion is held by the cable holding part 60 is pulled frontward (toward the welding torch 31) with a movement of the welding torch 31, the movable member 62 swings about the pair of supporting pins 67 against the elastic force exerted by the tension springs 75. The tension that acts on the torch cable 40 is absorbed by the slack given to the portion between the holding hole 58 and the cable holding part 60. In the above process, the rotatable holder 63 rotates about the pair of supporting pins 76 in such a manner as to follow the position of the torch cable 40. Thus, the torch cable 40 is supported while the tension or slack given thereto is reduced.

Figure 11:
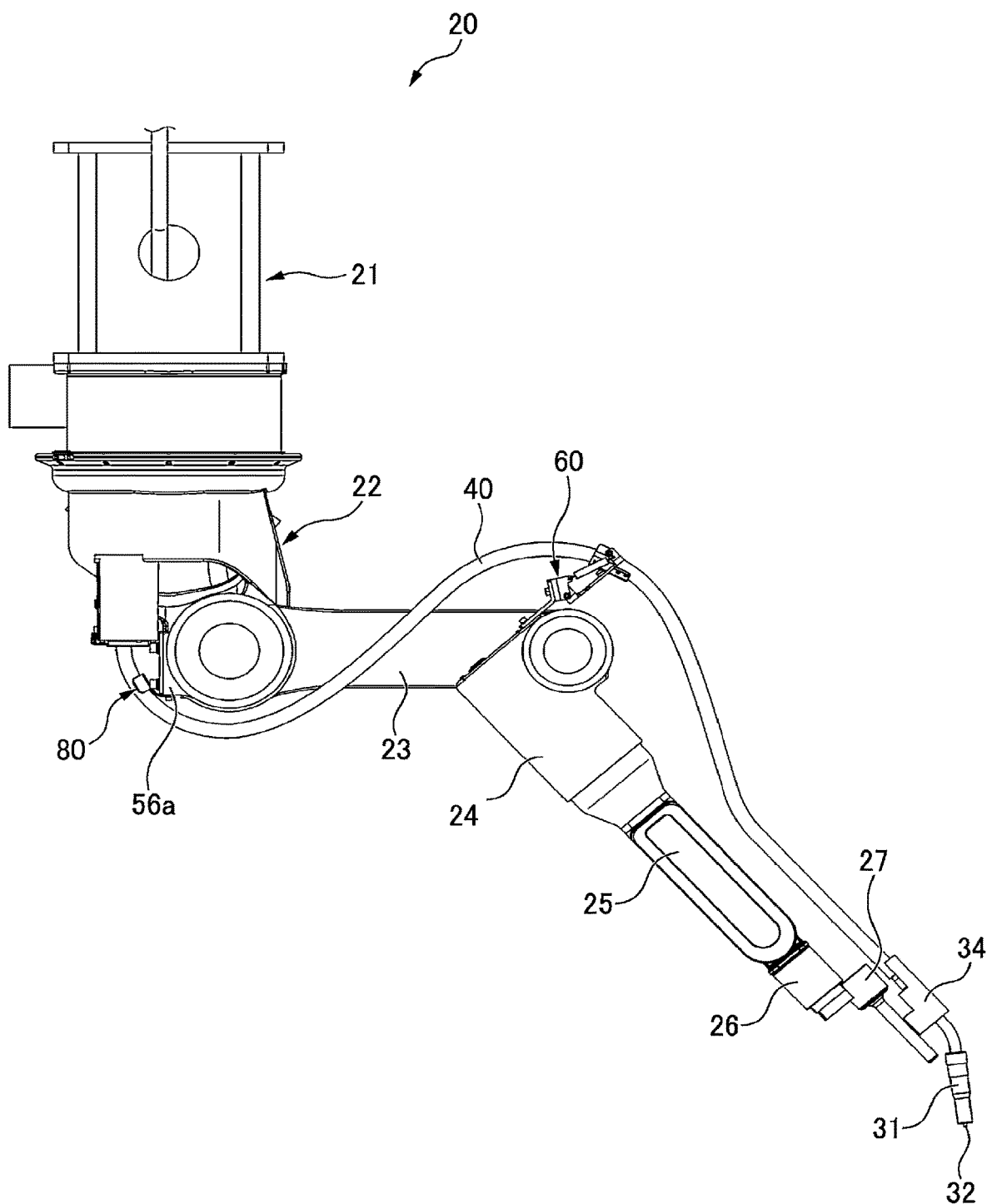
FIG. 11 is a left side view of the suspended welding robot, with first and second arms being in a reverse elbow position.

As described above, the torch cable 40 is held by the cable holding part 60. The cable holding part 60 swings or rotates in such a manner as to follow the movements of the wrist swiveling section 25, the wrist bending section 26, and the wrist rotating section 27. Therefore, the torch cable 40 is held stably with less tension or slack. FIG. 11 illustrates the welding robot 20 in a reverse elbow position, which is established when, in the suspended scheme, the first arm 23 and the second arm 24 are fully stretched to be aligned in a line, and the second arm 24 is further moved downward. In such a position, the torch cable 40 runs below the second driving shaft S2 and above the third driving shaft S3. Therefore, the slack in the portion of the torch cable 40 that is between the holding hole 58 and the cable holding part 60 is reduced. Furthermore, the torch cable 40 tends to be bent at the cable holding part 60. However, since the torch cable 40 is supported by the rotatable holder 63 in a rotatable manner, the degree of the bend is reduced.

Furthermore, the cable holding part 60 according to the present embodiment is configured such that the movable member 62 is swingable with respect to the fixed member 61. Therefore, the size of the fixed member 61 can be reduced. Consequently, the size of the cable holding part 60 as a whole can be reduced.

The torch cable 40 is held at the two positions, namely the holding hole 58 and the cable holding part 60, in one virtual plane F1. Therefore, the portion of the torch cable 40 that is between the holding hole 58 and the cable holding part 60 is bent within the virtual plane F1. Hence, the torch cable 40 is less likely to move around at the swiveling of the welding robot 20. Consequently, the risk of interference or winding of the torch cable 40 with or around the welding robot 20 itself, the workpiece, or any of other peripheral devices is reduced. Since the risk of interference or winding of the torch cable 40 is reduced, good performance in the feeding of the welding wire 32 is maintained, with no increase in the resistance generated in the feeding of the welding wire 32.

In the reverse elbow position, when the torch cable 40 is pulled frontward (toward the welding torch 31) and the slack given to the portion of the torch cable 40 that is between the holding hole 58 and the cable holding part 60 is absorbed, the torch cable 40 may interfere with the lower end corner 56a of the arm supporting part 56 and be damaged. In this respect, the welding robot 20 according to the present embodiment includes the protector 80 at the lower end corner 56a positioned in the virtual plane F1 passing through the holding hole 58 and the cable holding part 60. Therefore, the torch cable 40 is assuredly caught by the protector 80. Hence, interference of the torch cable 40 with the lower end corner 56a is prevented. Furthermore, the protector 80 has elasticity. Therefore, even if the torch cable 40 interferes with the protector 80, the torch cable 40 is not subjected to an excessive force and is assuredly protected. In addition, even in the reverse elbow position of the welding robot 20, the torch cable 40 is kept in a natural position with the rotation of the rotatable holder 63.

As illustrated in FIG. 5, it is preferable that a length L2 of the torch cable 40 between the holding hole 58 and the cable holding part 60 be 1.8 to 2.7 times an interaxial distance L1 of the first arm 23 between the second driving shaft S2 and the third driving shaft S3. If the length L2 of the torch cable 40 between the holding hole 58 and the cable holding part 60 is 1.8 or more times the interaxial distance L1 between the second driving shaft S2 and the third driving shaft S3, the torch cable 40 has a satisfactory length, providing an allowance for the reverse elbow position. Such a configuration widens the operable range of the welding robot 20 in the reverse elbow position. If the above length of the torch cable 40 is 2.7 or less times the interaxial distance L1 between the second driving shaft S2 and the third driving shaft S3, the torch cable 40 has a length that is not too long and is kept positioned within an appropriate area in a normal elbow position (see FIG. 5). Such a configuration reduces the probability of interference of the torch cable 40 with the welding robot 20 itself, the workpiece, or any of other peripheral devices.

Specifically, for example, if the interaxial distance L1 of the first arm 23 between the second driving shaft S2 and the third driving shaft S3 is 550 mm, the length L2 of the torch cable 40 between the holding hole 58, which serves as the second holding part, and the cable holding part 60 is preferably set to 1000 mm to 1500 mm.

The present invention is not limited to the above embodiment, and various modifications, improvements, and the like can be made thereto according to need.

For example, while the suspended welding robot according to the above embodiment employs a fixed scheme in which the base 21 thereof is fixed to the ceiling, the suspended welding robot may alternatively employ a movable scheme in which the base 21 is attached to a traveling structure included in an overhead travelling crane, which is not illustrated.

The welding robot may be the one intended for TIG welding. In such a case, a filler wire is passed through the conduit cable included in the torch cable.

While the suspended industrial robot according to the present invention has been described as a suspended welding robot, the suspended industrial robot is not limited to a welding robot and may be, for example, a transporting robot, an assembling robot, or a testing robot.

In the present invention, the first cable holding part 60 is provided on at least one of the first arm 23 and the second arm 24. However, considering the wire feeding performance; the interference of the cable with a workpiece, a jig, or any of other peripheral devices; and the widening of the operable range of the robot, it is preferable that the first cable holding part 60 be attached to the second arm 24, more preferably to a position of the second arm 24 that is around the third driving shaft S3 as in the above embodiment.

While the above description concerns a case where the first cable holding part 60 includes the movable member 62 that is attached to the fixed member 61 in a swingable manner, the first cable holding part 60 is not limited thereto and may include a movable member 62 that is slidable in the front-rear direction with respect to the fixed member 61.

The present application is based on a Japanese patent application (Japanese Patent Application No. 2019-127134) filed on Jul. 8, 2019, the content of which is incorporated herein by reference.

REFERENCE SIGNS LIST 19 ceiling
20 suspended welding robot (suspended industrial robot)
21 base
22 swivel section
23 first arm
24 second arm
31 welding torch (end effector)
35 socket
40 torch cable (cable)
41 motor-power-feed control cable
53 insertion opening
54 cable insertion part
57 extraction opening
58 holding hole (second cable holding part)
60 first cable holding part
61 fixed member
62 movable member
63 rotatable holder
72 swing proximal portion (one end portion)
73 rotatable-holder-supporting portion (other end portion)
75 tension spring (urging means)
80 protector
100 welding system
A opening area of extraction opening
B cross-sectional area of cable
F1 virtual plane (plane perpendicular to driving shaft and other driving shaft)

L1 interaxial distance between second driving shaft S2 and third driving shaft
S3 (interaxial distance between driving shaft and other driving shaft) SA, SB internal space
S1 first driving shaft (vertical shaft)
S2 second driving shaft (driving shaft)
S3 third driving shaft (other driving shaft)

The invention claimed is:

1. A suspended industrial robot comprising:
a base provided on a traveling structure of an overhead travelling crane or on a ceiling;
a swivel section capable of swiveling on the base about a vertical shaft;
a first arm coupled to the swivel section with a driving shaft in between;
a second arm coupled to the first arm with an other driving shaft in between;
an end effector provided at a distal portion of the second arm; and
a cable one end of which is connected to the end effector,
wherein the base and the swivel section have an internal space into which the cable is allowed to be inserted,
wherein the base has an insertion opening through which at least the cable is allowed to be passed into the internal space from an outside,
wherein a first cable holding part that holds the cable is installed on at least one of the first arm and the second arm,
wherein the cable passes through the internal space of the base and the swivel section and is routed up to the end effector with a midway portion of the cable being held by the first cable holding part,
wherein the first cable holding part includes
a movable mechanism including a fixed member that is fixed to the second arm, and a movable member that is attached at a first end portion to the fixed member via supporting pins such that the movable member is pivotable with respect to the fixed member; and
a rotatable holder attached to the movable member of the movable mechanism in a rotatable manner and that holds the cable.

2. The suspended industrial robot according to claim 1, wherein the cable is a torch cable, and the end effector is a welding torch.

3. The suspended industrial robot according to claim 2, further comprising:
a second cable holding part installed on or near the swivel section,
wherein the second cable holding part is positioned in a virtual plane, the virtual plane passing through the first cable holding part and being perpendicular to the driving shaft and to the other driving shaft, and
wherein the cable is held at at least two points, the two points being the first cable holding part and the second cable holding part.

4. The suspended industrial robot according to claim 1, further comprising:
a second cable holding part installed on or near the swivel section,
wherein the second cable holding part is positioned in a virtual plane, the virtual plane passing through the first cable holding part and being perpendicular to the driving shaft and to the other driving shaft, and
wherein the cable is held at at least two points, the two points being the first cable holding part and the second cable holding part.

5. The suspended industrial robot according to claim 4, wherein a protector that protects the cable from damage is provided on or near the swivel section, the protector being positioned in the virtual plane that passes through the first cable holding part and the second cable holding part.

6. The suspended industrial robot according to claim 4, wherein the second cable holding part is positioned on the swivel section, and
wherein a length of the cable between the second cable holding part on the swivel section and the first cable holding part is 1.8 or more and 2.7 or less times an interaxial distance between the driving shaft and the other driving shaft.

7. The suspended industrial robot according to claim 1, wherein the swivel section has an extraction opening through which the cable is to be passed, the extraction opening being at a position near a center of the vertical shaft, and
wherein the cable is routed through the swivel section in such a manner as to pass through the position near the center of the vertical shaft.

8. The suspended industrial robot according to claim 7, wherein a ratio of a cross-sectional area B of the cable to an opening area A of the extraction opening (B/A) is 40% or smaller.

9. The suspended industrial robot according to claim 1, wherein the movable member includes the first end portion that is supported by the fixed member and a second end portion to which the rotatable holder is attached, and
wherein urging means is connected to the second end portion of the movable member and the fixed member and urges, toward an initial position, the movable member that is swingable with respect to the fixed member.

10. A suspended industrial robot comprising:
a base provided on a traveling structure of an overhead travelling crane or on a ceiling;
a swivel section capable of swiveling on the base about a vertical shaft;
a first arm coupled to the swivel section with a driving shaft in between;
a second arm coupled to the first arm with an other driving shaft in between;
an end effector provided at a distal portion of the second arm; and
a cable one end of which is connected to the end effector,
wherein the base and the swivel section have an internal space into which the cable is allowed to be inserted,
wherein the base has an insertion opening through which at least the cable is allowed to be passed into the internal space from an outside,
wherein a first cable holding part that holds the cable is installed on at least one of the first arm and the second arm,
wherein the cable passes through the internal space of the base and the swivel section and is routed up to the end effector with a midway portion of the cable being held by the first cable holding part,
wherein a second cable holding part is installed in an arm support part that extends from two opposite positions on a circumference of the swivel section,
wherein the second cable holding part is positioned in a virtual plane, the virtual plane passing through the first cable holding part and being perpendicular to the driving shaft and to the other driving shaft, and wherein the cable is held at at least two points, the two points being the first cable holding part and the second cable holding part,
wherein the first cable holding part includes
- a movable mechanism including a fixed member that is fixed to the second arm, and a movable member that is reciprocatable or swingable with respect to the fixed member; and
- a rotatable holder attached to the movable member of the movable mechanism in a rotatable manner and that holds the cable.

11. The suspended industrial robot according to claim 10, wherein the cable is a torch cable, and the end effector is a welding torch.

12. The suspended industrial robot according to claim 10, wherein the swivel section has an extraction opening through which the cable is to be passed, and
wherein the cable is routed through a central region of the swivel section in which the vertical shaft extends.

13. The suspended industrial robot according to claim 12, wherein a ratio of a cross-sectional area (B) of the cable to an opening area (A) of the extraction opening (B/A) is 40% or smaller.

14. The suspended industrial robot according to claim 10, wherein the movable member includes a first end portion that is supported by the fixed member and a second end portion to which the rotatable holder is attached, and
wherein urging means is connected to the second end portion of the movable member and the fixed member and urges, toward an initial position, the movable member that is swingable with respect to the fixed member.

15. The suspended industrial robot according to claim 10, wherein a protector that protects the cable from damage is provided on or near the swivel section, the protector being positioned in the virtual plane that passes through the first cable holding part and the second cable holding part.

16. The suspended industrial robot according to claim 10, wherein the second cable holding part is positioned on the swivel section, and
wherein a length of the cable between the second cable holding part on the swivel section and the first cable holding part is 1.8 or more and 2.7 or less times an interaxial distance between the driving shaft and the other driving shaft.

* * * * *